(12) United States Patent
Charny et al.

(10) Patent No.: US 7,675,918 B2
(45) Date of Patent: Mar. 9, 2010

(54) HASH-BASED PREEMPTION

(75) Inventors: Anna Charny, Sudbury, MA (US); Francois Le Faucheur, Valbonne (FR)

(73) Assignee: Cisco Technology, Inc, San Jose, CA (US)

( * ) Notice: Subject to any disclaimer, the term of this patent is extended or adjusted under 35 U.S.C. 154(b) by 583 days.

(21) Appl. No.: 11/598,475

(22) Filed: Nov. 13, 2006

(65) Prior Publication Data

US 2008/0112316 A1 May 15, 2008

(51) Int. Cl.
*G01R 31/08* (2006.01)
*H04L 12/28* (2006.01)

(52) U.S. Cl. .................. 370/395.32; 370/230; 370/392; 370/412

(58) Field of Classification Search .......... 370/419, 370/420, 400, 389, 392, 396, 428, 429, 395.1, 370/395.21, 395.4, 395.41, 395.42, 412, 370/413, 235, 236, 230, 231, 232, 233, 234
See application file for complete search history.

(56) References Cited

U.S. PATENT DOCUMENTS 7,006,435 B1 * 2/2006 Davies et al. ............... 370/230
7,023,843 B2 * 4/2006 Ruutu et al. ................. 370/388
7,061,864 B2 * 6/2006 van Everdingen ........... 370/233
7,355,977 B1 * 4/2008 Li ............................ 370/235.1

FOREIGN PATENT DOCUMENTS

EP       1 157 502 B1      7/2005

OTHER PUBLICATIONS

A. Bader et al., "RMD-QOSM—The Resource Management in Diffserv QOS Model", ,draft-ietf-nsis-rmd-07.txt, Jun. 23, 2006.
B. Briscoe et al.,An edge-to-edge Deployment Model for Pre-Congestion Notification:Admission Control over a Diffserv Region,draft-briscoe-tsvwg-cl-architecture-04.txt,Oct. 25, 2006.

* cited by examiner

*Primary Examiner*—Hanh Nguyen
(74) *Attorney, Agent, or Firm*—Cindy Kaplan

(57) ABSTRACT

Methods and systems for preemption in a network having a core device with at least one egress interface are disclosed. In one embodiment, the method includes performing flow-based hash utilizing a plurality of hash-buckets each set to a first state or a second state and computing a load based on a rate measurement that excludes flows which hash into hash-buckets having a state set to the second state. The computed load is compared to a preemption threshold and if the computed load exceeds the preemption threshold, the state of at least one of the hash-buckets is changed from the first state to the second state. An action, such as dropping all packets or marking all packets, is performed on flows hashing in a hash-bucket in the second state.

20 Claims, 5 Drawing Sheets

HASH-BASED PREEMPTION

BACKGROUND OF THE INVENTION

The present disclosure relates generally to preemption in a computer network.

The IETF (Internet Engineering Task Force) is investigating the area of stateless or reduced-state admission control for real-time inelastic traffic. (See, B. Briscoe et al., "An edge-to-edge Deployment Model for Pre-Congestion Notification Admission Control over a DiffServ Region", IETF draft-briscoe-tsvwg-cl-architecture-04.txt, Oct. 25, 2006 and A. Bader, "RMD-QOSM—The Resource Management in Diffserv QOS Model", draft-ietf-nsis-rmd-07.txt, Jun. 23, 2006). One of the challenges related to stateless (as well as stateful) Call Admission Control (CAC) is that occasional topology changes (e.g., in response to a link or node failure) may result in bypassing the CAC completely as routing redirects the traffic to a different path than it was admitted to originally. This can lead to severe congestion that could last for a potentially long time. In these circumstances, links which normally operate under their engineered load due to admission control become suddenly overloaded. As a result, all real-time flows sharing a congested link can become affected and suffer possibly severe QoS (Quality of Service) degradation. If these flows are voice flows, for example, then such QoS degradation may result in all, or many users on the link eventually hanging up and dropping their connection if substantial service degradation lasts longer than a few seconds. It is, therefore, desirable to have a mechanism which will selectively preempt some number of flows to alleviate congestion, restoring the necessary level of QoS to the other flows. This mechanism is referred to as Preemption or Severe Congestion Handling in the above-referenced IETF drafts. It is desirable that such preemption is done on a per-flow basis rather than per-packet as much as possible, to prevent a degradation of service to all flows involved in congestion.

Similar problems may arise not only with networks running an admission control mechanism, but also in networks that use bandwidth provisioning based on the knowledge of the traffic matrix. For example, if real time traffic is using EF PHB (Expedited Forwarding Per-Hop Behavior) and the network is properly provisioned in the absence of failure as well as under some expected failure scenario, an unexpected link, node or SRLG (Shared Risk Link Group) failure or an unexpected combination of those may result in a sudden overload of some links, causing QoS service degradation. Preemption is also useful in networks which do run admission control in cases where there is an unexpected traffic surge.

Hence, regardless of the presence or lack of bandwidth reservations under normal, non-failure conditions, the possibility of failures (without full bandwidth protection of those failures as is commonly the case in packet networks) results in a need for a mechanism that allows preemption of a set of flows while allowing the rest of the flows to maintain their QoS guarantee. There are two solutions that have been proposed in the above-referenced IETF drafts. However, both of these solutions require a per-ingress-egress estimate of congestion at the egress edge to determine the correct amount of traffic to drop, and policing of these schemes presents a serious challenge.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Methods and systems for preemption in a network comprising a core device having at least one egress interface configured for flow-based hash utilizing a plurality of hash-buckets are disclosed. In one embodiment, each of the hash-buckets are set to a first state or a second state and the method generally comprises computing a load based on a rate measurement that excludes flows which hash into hash-buckets having a state set to the second state. The computed load is compared to a preemption threshold and if the computed load exceeds the preemption threshold, the state of at least one of the hash-buckets may be changed from the first state to the second state. An action, such as dropping all packets or marking all packets, is performed on flows hashing in a hash-bucket in the second state.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
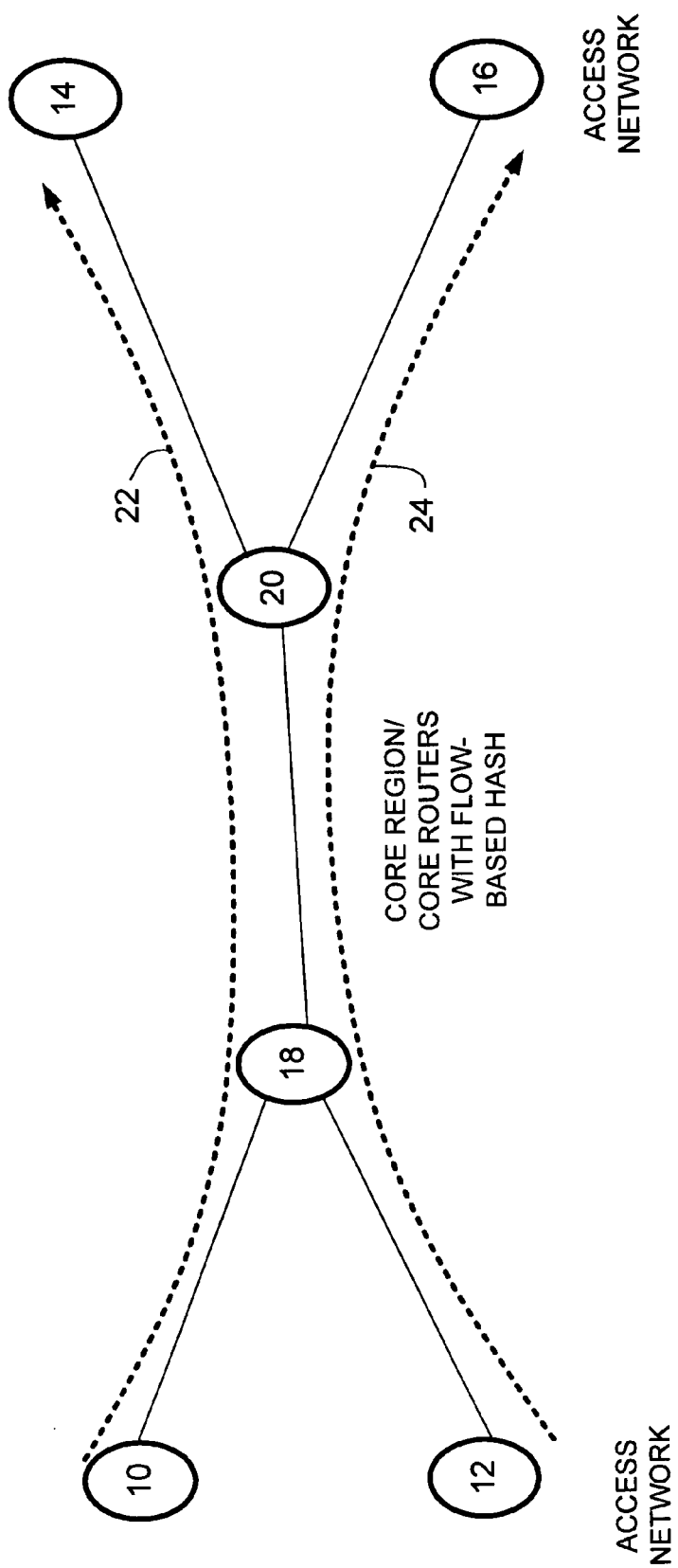
FIG. 1 illustrates an example of a network in which embodiments described herein may be implemented.

Referring now to the drawings, and first to FIG. 1, one example of a network that may implement embodiments described herein is shown. For simplification, only a small number of nodes are shown. The embodiments operate in the context of a data communication network including multiple network elements. Some of the nodes in a network that employs the embodiments may be network devices such as routers or gateways. The network device may include, for example, a master central processing unit (CPU), interfaces, and a bus. The CPU preferably includes memory and a processor. The network device may be implemented on a general purpose network host machine such as a computer system or network device described below with respect to FIG. 5.

Data traffic flows through various nodes including edge nodes 10, 12, 14, 16 and core nodes 18, 20. Adjacent nodes are coupled via one or more communication paths (links). The edge nodes may be ingress or egress edge nodes, depending on the direction of the traffic flow. In the example of FIG. 1, traffic passes along path 22 from ingress edge node 10 through core (interior nodes) 18, 20 to egress edge node 14. Traffic is also routed from ingress edge node 12 to egress edge node 16 through core nodes 18 and 20 via path 24. As described below, the core nodes 18, 20 meter traffic and mark or drop packets as required to maintain traffic load below a specified preemption threshold.

It is to be understood that the network shown in FIG. 1 is just one example and that the method and system described herein may be used with various configurations, sizes, and types of networks. The method and system may be implemented, for example, in network core routers, or a combination of core routers and edge routers, VoIP Gateways, or Session Border Controllers (SBCs).

The embodiments described herein provide preemption without the need for per-flow state in the core of a network, or per ingress/egress measurement at the edge nodes. In one embodiment, referred to below as hash-based preemption with drop, the system is self-policing, so that preemption of flows is directly enforced by core routers even if edge devices are not configured to assist in preemption. In another embodiment, referred to below as hash-based preemption with marking, the system may allow edge devices to make decisions as to which flows should be dropped, so that more sophisticated policies can be applied. Also, an edge policer may be implemented to ensure that if marked flows continue to send packets, those packets are dropped.

Hash-Based Preemption with Drop

The following describes an embodiment utilizing hash-based preemption with dropping of packets. The operation on core devices is first described, followed by a description of operation at edge routers and end systems.

Figure 2:
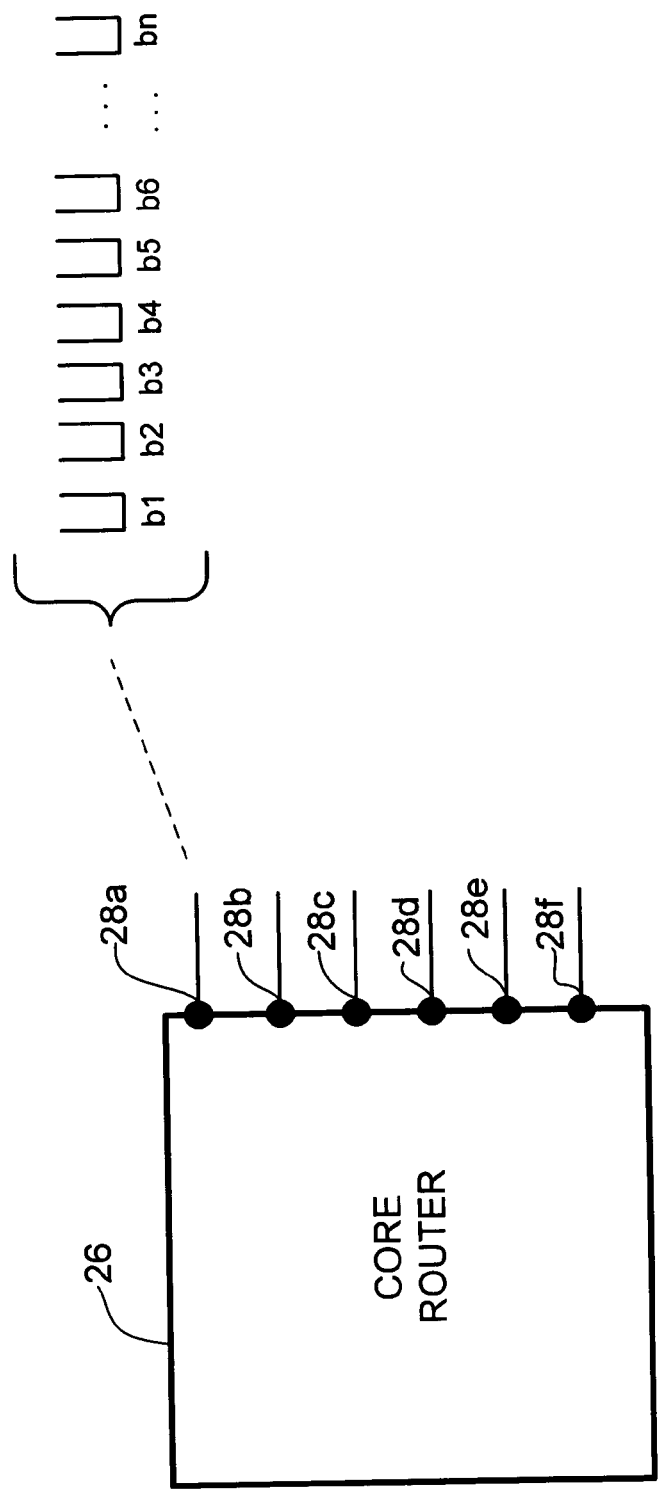
FIG. 2 is a diagram illustrating an example of a core router and hash-buckets used in the network of FIG. 1 for hash-based preemption.

The core routers in the datapath maintain a flow-based hash of all flows going out of an egress interface. The flow-based hash is thus per-egress interface. FIG. 2 illustrates one example of a core router 26 having six egress interfaces 28$a$, 28$b$, 28$c$, 28$d$, 28$e$, 28$f$. It is to be understood that the core router 26 may have any number of egress interfaces, each interface configured to transmit traffic to a corresponding edge device. Each egress interface includes a number of hash-buckets b1, b2, b3, b4, b5, b6, . . . bn. The number of hash-buckets at each interface is preferably large enough to provide sufficient granularity per bucket to control the rate at the output link. For example, an interface may have 100 hash-buckets to provide approximately 1% rate granularity per bucket.

Each hash-bucket is set to a first state or a second state. The first state is a "forward" state in which flow is routed from the core router through the egress interface towards the corresponding edge device, as is done in normal operation (non-congestion condition). The second state is "drop" in which all packets of all of the flows that hash into the hash-bucket and egress the interface are dropped by the core router.

Operation at the core router includes measuring flow at specified intervals, computing a "clipped" load, for the purpose of determining how much additional load needs to be dropped (if any) at an egress interface, and changing the state of hash-buckets as required. The measurement may be performed, for example, at an interval corresponding to a large RTT (Round Trip Time), or any other specified interval.

The clipped load on an egress interface corresponds to the remaining aggregate load that is not already dropped at the egress interface. The clipped load is computed using a rate measurement that excludes all of the flows which hash into a hash-bucket having a state set to drop. The rate measurement may therefore be performed after the drop. Alternatively, the rate measurement could be performed before the drop, but excluding all the flows which hash into a bucket whose state is "drop". The core router then determines how much additional load needs to be dropped on a given egress interface by comparing the measured clipped load to a preemption threshold. The state of a corresponding number of hash-buckets is then changed to drop, as required to bring downs the load to the preemption threshold. For example, if the clipped load is 120% of the preemption threshold, then we would like to remove the extra 20% excess traffic, which translates into setting 20/120 (or about 17%) of the hash-buckets set to forward state are changed to drop state. (When the desired percentage of the hash buckets results in a fractional number of hash buckets to be set to drop state, the number may be rounded up to the nearest integer).

Figure 3:
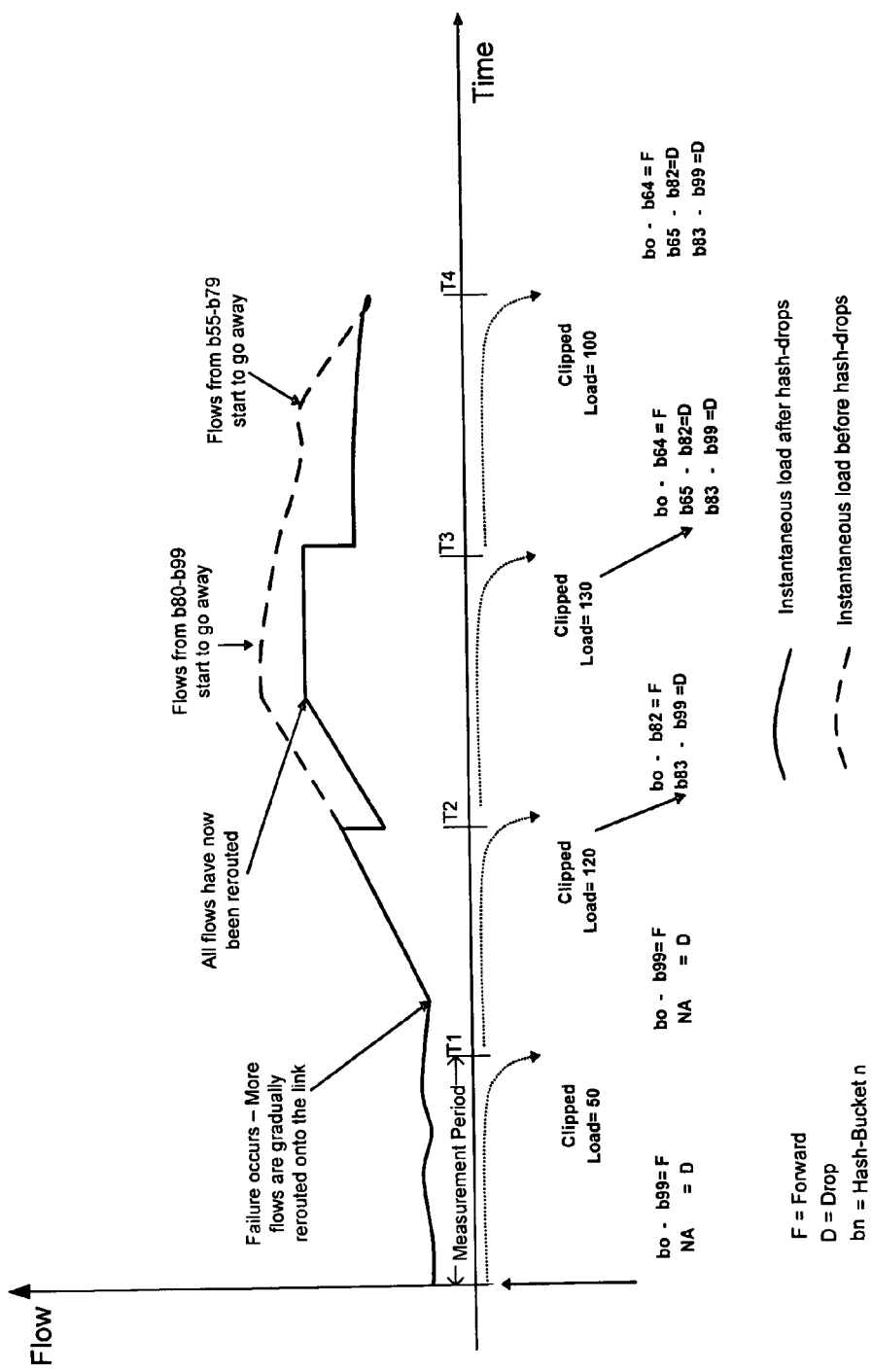
FIG. 3 is a graph illustrating an example of operation at the core router.

FIG. 3 illustrates operation at the core router with a graph of flow versus time. At interval T1 a failure occurs and more flows are gradually rerouted on the link. At T1 the clipped load is 50 and no flows are dropped (since the preemption threshold has not been exceeded). All flows at hash buckets b0-b99 are forwarded. At time T2, the clipped load has reached 120 due to the failure that occurred at T1. The state at hash-buckets b83-b99 is changed from forward to drop. The router now drops flows at hash-buckets b83-b99 and continues to forward flows at hash-buckets b0-b82. The flows from hash-buckets b83-b99 start to go away some time after T2. This is because the users hang up because they cannot communicate or because of some other mechanisms such as detection of excessive loss in end systems triggering a call release. At T3 the clipped load is 130 so the router drops additional load in the proportion of 30/130 (i.e., 23%). The router will therefore change 23% of the buckets that were in the forwarding state (b0-b82) to the drop state. For example, the router can set hash-buckets b65-b82 to drop.

The flows from b65-b82 start to go away after T3. At time T4 the clipped load is down to 100 (or below if some flows have been terminated in the meantime via normal termination procedures such as users having finished their phone conversations) and the state remains the same at all hash-buckets.

If the clipped load stays below the preemption threshold for a number of consecutive measurement periods, the core router determines that the network has converged and reseeds the flow-based hash. A counter, timer, or other suitable mechanism may be used to keep track of the number of measurement cycles or time interval. Reseeding the flow-based hash may be achieved, for example, by changing some input variable used in the hashing algorithm. Reseeding the flow-based hash is desirable to ensure that the flows which remain after the preemption reaction hash evenly across all of the hash-buckets. The preemption mechanism is then ready to react properly upon the occurrence of a new event necessitating preemption. The reseeding is preferably only done after a period sufficiently long so that flows which were dropped by the preemption mechanism would have already been torn down by edge devices or would have been sufficiently penalized. This is to ensure that edge devices do not circumvent the self-policing behavior of the system by simply leaving the calls in place until the core routers reseed their hash.

Figure 4:
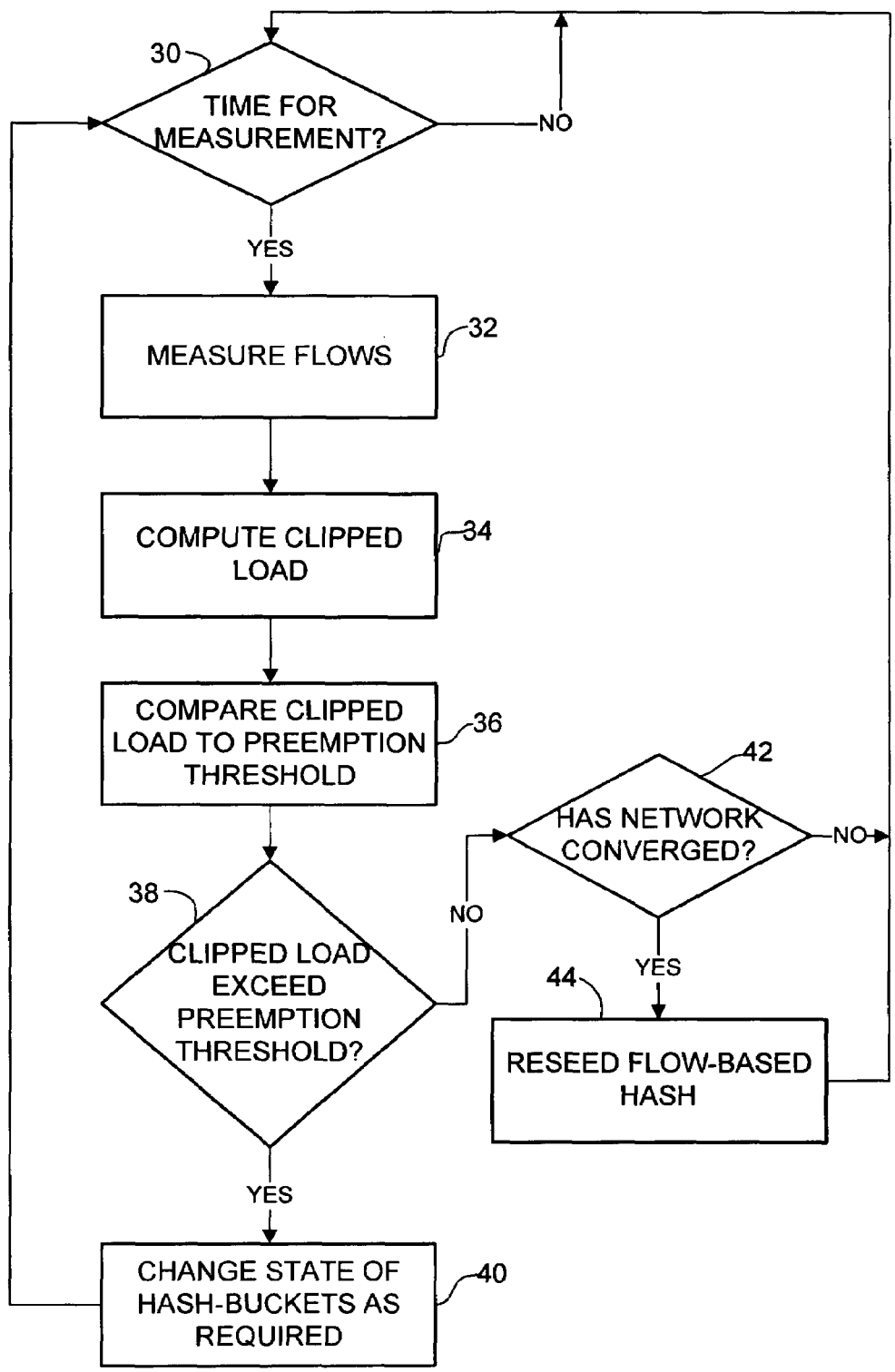
FIG. 4 is a flowchart illustrating an example of a method for hash-based preemption.

FIG. 4 is a flowchart illustrating one example of a process for hash-based preemption at the core router. At each measurement interval, the core router measures flows (steps 30 and 32). As noted above, the rate measurement excludes all flows which hash into a hash-bucket having a state of drop. At step 34 the clipped load is computed based on the rate measurement. The clipped load is then compared to the preemption threshold (step 36). If the clipped load exceeds the preemption threshold (step 38), the router changes the state of corresponding hash-buckets to drop, as required (step 40). If the clipped load does not exceed the preemption threshold and the clipped load has stayed below the preemption threshold for a set number of consecutive measurement periods, the network has converged and the router reseeds the flow-based hash (steps 38, 42, and 44).

The hashing may be extended to have some DSCP (Differentiated Services Code Point) awareness so that key flow context information can be inferred from the DSCP and taken into account for flow hashing and selection of flows to drop. For example, if the flow preemption and priority (such as those of MLPP) is reflected in the DSCP, then all non-routine flows can hash into a special non-droppable bucket and only routine flows (e.g., those hashing onto regular hash-buckets) are eligible for dropping.

The following describes operation at the edge routers and end-systems in accordance with two example embodiments.

In the first embodiment, there is no action taken at the edge routers. The end-systems (e.g., VoIP gateways) realize that they have lost connectivity (by observing that they no longer receive media packets at the expected rate) and may clear the call properly (e.g., via application level signaling).

In the second embodiment, the edge routers detect loss on a per-flow basis and initiate tear-down of the network reservation for the corresponding flows, which in turn may result in end-systems clearing the calls (e.g. via application level signaling such as SIP (Session Initiation Protocol)).

In order to prevent a possible overshoot problem (whereby the system would tear down too many calls), tear down of calls is preferably only performed if the loss is detected on 100% (or close to 100%) of the packets of a flow and lasts for more than a specified period of time of the order of the measurement period.

For the above described hash-based preemption, the flows are preferably spread generally equally on all buckets of a router (i.e., roughly the same equivalent bandwidth is carried over each hash-bucket). This assumes a high number of flows, with a high number of flows of each size if there are different sizes. Also, the routers preferably have random seeds for hash, such that what would go in one bucket on a first router would spread randomly on a second router, to ensure that the buckets which are set to drop on the first router are not simply empty on the second router. This ensures that in the case of multiple congestion points, the second congestion point will still drop the correct number of flows. Preemption events are preferably sufficiently rare (although each event can last for some period of time), so that the system has a chance to converge between different preemption events.

As can be observed from the foregoing, hash-based preemption with drop provides a number of advantages over conventional preemption. For example, when there is congestion, some subset of flows is dropped so that the rest of the flows can have their QoS protected. As noted above, the system does not need any per-flow states in core devices or any per ingress/egress monitoring in edge devices. The system is also self-policing because it drops excess flows, so that it does not need cooperation by end-systems to react to some feedback mechanism indicating congestion such as ECN (Explicit Congestion Notification) feedback. Furthermore, the system does not require any tunneling in the core. In the case where the preemption reaction (i.e., call tear down) is left to end-systems (rather than edge devices), the system does not suffer from any loss of accuracy due to lack of aggregation. This is because the exact amount of flows to be dropped is already selected at the congestion point and not left to end-devices to pick (in a distributed manner) what subset of flows needs to be torn down.

Hash-Based Preemption with Marking

With the hash-based preemption with marking embodiment, the core routers operate similar to described above for hash-based preemption with drop, however, instead of being dropped, the flows in the selected buckets are marked. The operation for hash-based preemption with marking is as shown in FIG. 4, with the state change at step 40 being from "forward" (first state) to "mark" (second state). The measurement on core routers of the clipped-load excludes the flows which are marked at that hop. One example of marking is to change the value of one (or multiple) field (s) in the packet header. A specific example is to remark the DSCP. Another example would be to remark the PCN field.

The edge devices or end-systems may initiate reservation tear down or, when they participate in application level signaling, may initiate call tear down for calls whose packets are marked. In the hash-based preemption with marking embodiment, the edge devices and end-systems have the flexibility to decide to override the cue (e.g., marking) from the core router to tear down a call. The decision is based on context information associated with the flow and known by the edge device or end-system. For example, one of the marked calls may be an important call and the edge device may decide not to drop that particular call. The importance of the call may be based on, for example, MLPP (Multilevel Priority and Preemption) or other suitable priority scheme. The edge device may decide that because this exception is done for a negligible proportion of calls, the corresponding excess load can be absorbed by the system. Alternatively, the edge device may decide to drop other calls (non-marked) that come from the same ingress edge in order to free up the necessary capacity. The edge device may use, for example, RSVP (Resource Reservation Protocol) information such as PHOP (Previous HOP) to identify which other call come from the same ingress edge.

The following describes one example of performing policing at the edge device or an edge policer. In this example, an operator O1 is running a transit network comprising only core routers (e.g., nodes 18, 20 of FIG. 1). Another operator O2 is connected to O1 and running edge devices or end-systems (e.g., nodes 14, 16 of FIG. 1). As described below, an aggregate policing approach is used to ensure that when O1 is entering a preemption phase, O2 will drop enough calls when it receives a marking indication, while at the same time allowing O2 to make some arbitrary decisions about which calls to drop. Thus O2 does not necessarily drop the calls which have been marked, because those marked calls may end up being more important than unmarked calls.

In one embodiment, O1 uses the marking information (on an aggregate basis) at the egress boundary from O1 to O2. O1 may collect statistics on the number of packets/bytes which are egressing its network towards O2 with marking and use this as a measure of how much O2 is not behaving properly. If O2 is behaving correctly, the amount of marked traffic should be very small over a sustained period. For example, the amount of marked traffic may be significant during the preemption convergence time but then drop down to zero and average to very little over a long period.

In another embodiment, O1 meters in real time the rate of marked traffic and takes action if the rate of marked traffic remains high for a sustained period of time. The sustained period of time preferably exceeds normal preemption convergence time. The action may include dropping all of the marked traffic.

Another option is to use flow-aware policers. The policers keep track of all marked flows and allow the flows some time to react. The policers then drop all packets of these flows. This provides a more deterministic reaction, but requires per-flow policers.

In one embodiment, the router is configured to switch from marking to dropping if it sees a combination of overload and consistent traffic coming into a hash-bucket in a marking state for several measurement intervals after the token bucket is set to mark in the current preemption cycle (i.e., after the decision to mark a bucket has been made but before the hash is reseeded).

The hash-based preemption with marking provides a number of advantages. The policing allows edge devices and end-systems to enforce their own policy and decide which calls to drop. The hash-based scheme provides an advantage over other preemption mechanisms based on marking because the marked traffic identifies precisely the set of flows that have been selected by the network as needing to be torn down, so penalizing marked flows only affects the misbehaving edge devices and end-systems. The system allows edge devices and end-systems to enforce whatever policy they choose based on flow context. If the edge devices have RSVP information identifying remote edges, it is easy for the edge devices to select another less important flow (among unmarked flow) sharing the same bottleneck to sacrifice instead of a marked flow. Also, the system is not subject to potential overshoot due to transient random drop because edges devices only react on explicitly marked flows as opposed to simply reacting to loss within a flow.

Call Admission Control

The hash-based preemption described above (drop or mark) can be combined with different Call Admission Control (CAC) mechanisms, such as described below.

In one example, same rate measurement as already used with preemption is used in the core, but the measured rate is also compared against the (lower) CAC threshold. If the CAC threshold is exceeded then all flows (step) are marked with CAC-CE (CAC-Congestion Experienced). The edge device stops admitting all new calls for a given ingress/egress pair as long as at least one flow in that pair is receiving CAC-CE. This does not require monitoring of CAC-CE marking ratio on a per ingress/egress pair.

It is to be understood that the CAC mechanism described above is only an example, and that different CAC mechanisms may be used with the hash-based preemption, without departing from the scope of the invention.

Network Device

Figure 5:
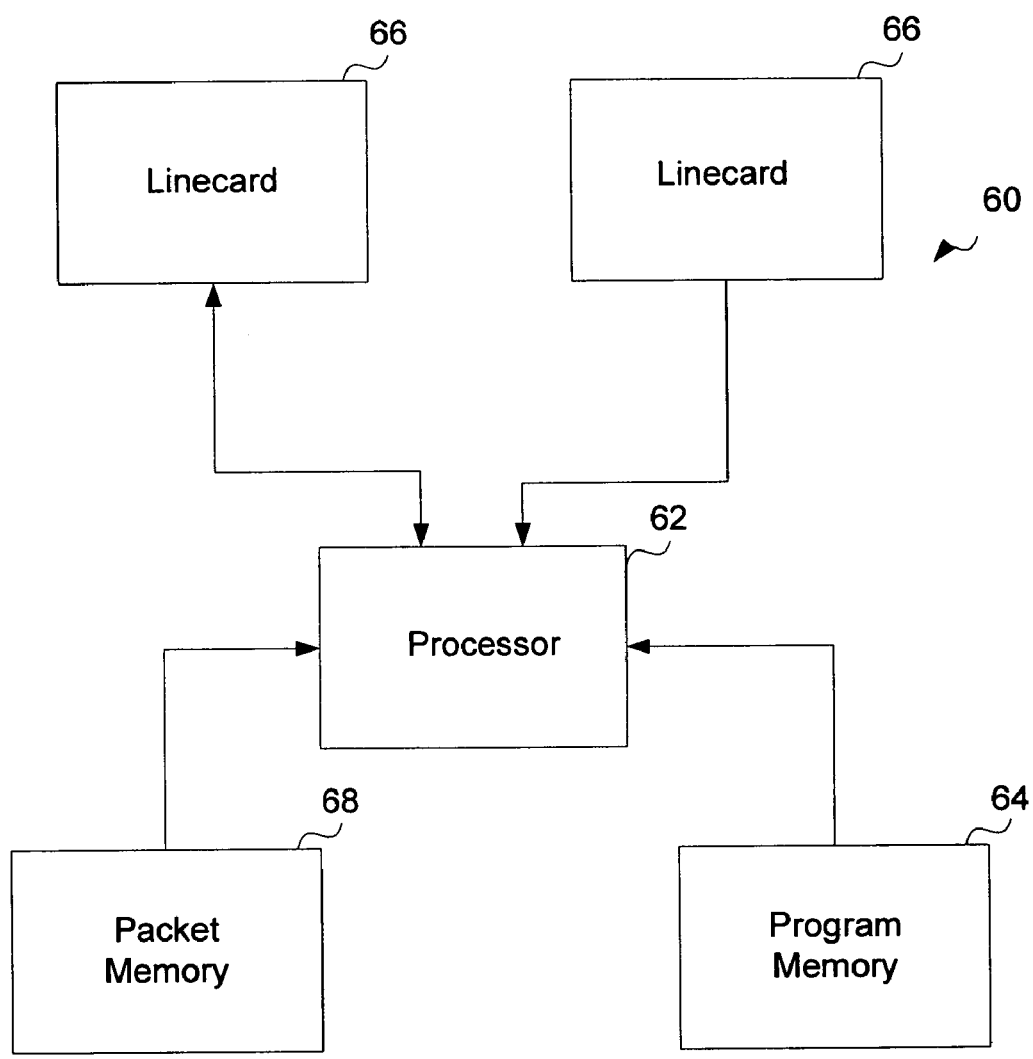
FIG. 5 depicts an example of a network device useful in implementing embodiments described herein.

FIG. 5 depicts a network device 60 that may be used to implement embodiments described herein. In one embodiment, network device 60 is a programmable machine that may be implemented in hardware, software, or any combination thereof. A processor 62 executes codes stored in a program memory 64. Program memory 64 is one example of a computer-readable medium. Program memory 64 can be a volatile memory. Another form of computer-readable medium storing the same codes would be some type of non-volatile storage such as floppy disks, CD-ROMs, DVD-ROMs, hard disks, flash memory, etc.

Network device 60 interfaces with physical media via a plurality of linecards 66. Linecards 66 may incorporate Ethernet interfaces, DSL interfaces, Gigabit Ethernet interfaces, 10-Gigabit Ethernet interfaces, SONET interfaces, etc. As packets are received, processed, and forwarded by network device 60, they may be stored in a packet memory 68. To implement functionality according to the system, linecards 66 may incorporate processing and memory resources similar to those discussed above in connection with the network device as a whole.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for preemption in a network comprising a core device having at least one egress interface, the method comprising:
   performing flow-based hash at said egress interface utilizing a plurality of hash-buckets each set to a first state or a second state;
   computing at a processor of the core device, a load based on a rate measurement that excludes flows which hash into said hash-buckets set to said second state;
   comparing said computed load to a preemption threshold; and
   if said computed load exceeds said preemption threshold, changing a state of at least one of said plurality of hash-buckets from said first state to said second state.

2. The method of claim 1 further comprising:
   forwarding flows that hash into said hash-buckets in said first state; and
   dropping flows that hash into said hash-buckets in said second state.

3. The method of claim 2 wherein the core device is in communication with an edge device configured to detect loss of packets from a flow and initiate a call tear-down.

4. The method of claim 2 wherein the core device is in communication with an edge device configured to detect loss of packets from a flow and initiate a network reservation tear-down.

5. The method of claim 1 further comprising:
   marking packets for flows that hash into said hash-buckets set to said second state; and
   forwarding flows that hash into said hash-buckets set to said second state.

6. The method of claim 5 wherein the core device is in communication with an edge device configured to select a flow to drop based on said marked packets.

7. The method of claim 5 wherein the core device is in communication with an edge device configured to select a flow to drop based on a priority of said flow.

8. The method of claim 5 further comprising monitoring marked packets forwarded from the core device and dropping marked packets if the number of marked packets forwarded from the core device remains above a predefined threshold for a sustained period.

9. The method of claim 1 further comprising reseeding said flow-based hash if said computed load remains below said preemption threshold for a specified interval.

10. The method of claim 1 wherein said rate measurement is compared to a call admission control threshold and at least some packets are marked to indicate congestion if said call admission control threshold is exceeded.

11. An apparatus for preemption in a network, comprising:
    an egress interface configured for flow-based hash utilizing a plurality of hash-buckets each set to a first state or a second state; and
    a processor configured for computing a load based on a rate measurement that excludes flows which hash into said hash-buckets set to said second state, comparing said computed load to a preemption threshold, and if said computed load exceeds said preemption threshold, changing a state of at least one of said plurality of hash-buckets from said first state to said second state.

12. The apparatus of claim 11 wherein the apparatus is configured to forward flows that hash into said hash-buckets in said first state and drop flows that hash into said hash-buckets in said second state.

13. The apparatus of claim 12 wherein the apparatus is configured for communication with an edge device configured to detect loss of packets from a flow and initiate a call tear-down.

14. The apparatus of claim 12 wherein the apparatus is configured for communication with an edge device configured to detect loss of packets from a flow and initiate a network reservation tear-down.

15. The apparatus of claim 11 wherein the apparatus is configured to mark packets for flows that hash into said hash-buckets set to said second state and forward flows that hash into said hash-buckets set to said first state or said second state.

16. The apparatus of claim 15 wherein the core device is configured for communication with an edge device configured to select a flow to drop based on said marked packets and a priority of said flow.

17. The apparatus of claim 11 wherein the apparatus is configured to reseed said flow-based hash if said computed load remains below said preemption threshold for a specified interval.

18. A system for preemption in a network comprising a core device having at least one egress interface, the system comprising:

means for performing flow-based hash at said egress interface utilizing a plurality of hash-buckets each set to a first state or a second state;

means for computing a load based on a rate measurement that excludes flows which hash into said hash-buckets set to said second state;

means for comparing said computed load to a preemption threshold; and means for changing a state of at least one of said plurality of hash-buckets from said first state to said second state, if said computed load exceeds said preemption threshold.

19. The system of claim 18 further comprising:

means for forwarding flows that hash into said hash-buckets in said first state; and means for dropping flows that hash into said hash-buckets in said second state.

20. The system of claim 18 further comprising:

means for marking packets for flows that hash into said hash-buckets set to said second state; and means for forwarding flows that hash into said hash-buckets set to said first state or said second state.

* * * * *